(12) United States Patent
Hineno et al.

(10) Patent No.: US 7,887,448 B2
(45) Date of Patent: Feb. 15, 2011

(54) POWER TRANSMISSION BELT

(75) Inventors: Yorifumi Hineno, Hyogo (JP); Syuhei Nishida, Nishi-machi (JP); Satoshi Shimoo, Hyogo (JP); Hiroyuki Kojima, Hyogo (JP)

(73) Assignee: Mitsuboshi Belting Ltd. (JP)

( * ) Notice: Subject to any disclaimer, the term of this patent is extended or adjusted under 35 U.S.C. 154(b) by 872 days.

(21) Appl. No.: 11/510,878

(22) Filed: Aug. 28, 2006

(65) Prior Publication Data

US 2007/0060431 A1    Mar. 15, 2007

(30) Foreign Application Priority Data

| Aug. 31, 2005 | (JP) | ............................. 2005-250487 |
| Feb. 3, 2006 | (JP) | ............................. 2006-27409 |
| Jun. 7, 2006 | (JP) | ............................. 2006-158143 |

(51) Int. Cl.
    *F16G 1/00* (2006.01)
(52) U.S. Cl. .................................................. 474/263
(58) Field of Classification Search ................ 474/236, 474/263; 524/297, 474, 495
    See application file for complete search history.

(56) References Cited

U.S. PATENT DOCUMENTS

| 5,023,135 | A | * | 6/1991 | Hasumi et al. ............... 428/336 |
| 5,610,217 | A | * | 3/1997 | Yarnell et al. ................ 524/397 |
| 6,058,994 | A | * | 5/2000 | Amino et al. ................ 152/167 |
| 6,177,503 | B1 | * | 1/2001 | Araki et al. .................. 524/492 |
| 6,268,438 | B1 | * | 7/2001 | Ellul et al. ................... 525/240 |
| 6,330,416 | B1 | * | 12/2001 | Yamada et al. ............... 399/284 |
| 6,358,171 | B1 | * | 3/2002 | Whitfield ..................... 474/266 |
| 6,461,264 | B1 | * | 10/2002 | Lofgren ....................... 474/260 |
| 6,559,219 | B2 | * | 5/2003 | Tadaki et al. ................. 524/495 |
| 6,689,005 | B2 | * | 2/2004 | Hasaka et al. ................ 474/267 |
| 2003/0069345 | A1 | * | 4/2003 | Minagoshi et al. .......... 524/441 |
| 2003/0096071 | A1 | * | 5/2003 | Takashima et al. ......... 428/36.9 |
| 2004/0019135 | A1 | * | 1/2004 | Horiguchi et al. ............. 524/47 |
| 2005/0037882 | A1 | * | 2/2005 | Hineno et al. ............... 474/263 |
| 2005/0182159 | A1 | * | 8/2005 | Udagawa et al. ............ 523/332 |

FOREIGN PATENT DOCUMENTS

JP            63051436 A   *   3/1988

(Continued)

OTHER PUBLICATIONS

Review of Glycol Ether and Glycol Ether Ester Solvents Used in the Coating Industry. Smith, R. L. Environmental Health Perspectives, vol. 57, p. 1-4. 1984.*

*Primary Examiner*—Robert A Siconolfi
*Assistant Examiner*—Stephen Bowes
(74) *Attorney, Agent, or Firm*—Wood, Phillips, Katz, Clark & Mortimer

(57) ABSTRACT

A power transmission belt having a body with an inside, an outside, and laterally oppositely facing side surfaces. The body has at least one surface that engages a pulley to frictionally transmit forces between the power transmission belt and pulley. The body includes rubber defining at least a part of the at least one surface. The rubber is a composition made up of a blend of at least: a) 100 parts by weight of an ethylene/α-olefin elastomer; b) 10 to 25 parts by weight of a plasticizer having a solubility parameter of from 8.3 to 10.7 $(cal/cm^3)^{1/2}$; and c) 60 to 110 parts by weight of an inorganic filler.

18 Claims, 3 Drawing Sheets

FOREIGN PATENT DOCUMENTS

| | | | |
|---|---|---|---|
| JP | 01070539 A | * | 3/1989 |
| JP | 07032815 A | * | 2/1995 |
| JP | 2005-147392 | | 6/2005 |
| JP | 2005147392 A | * | 6/2005 |

* cited by examiner

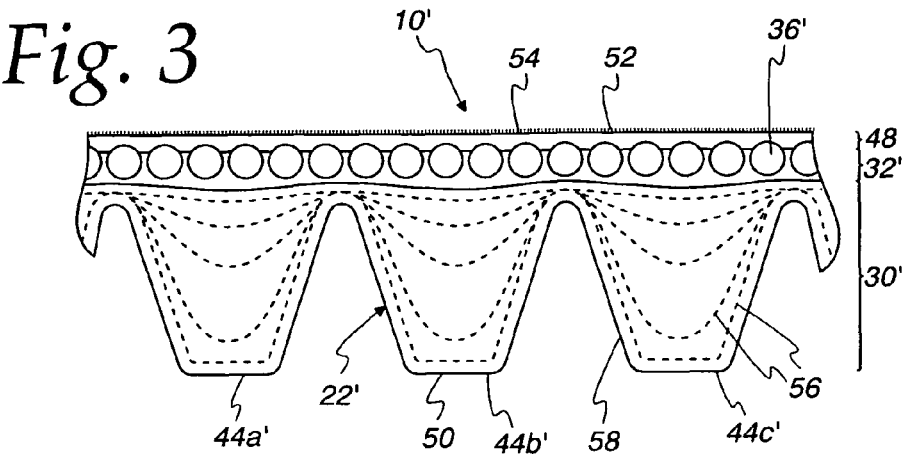
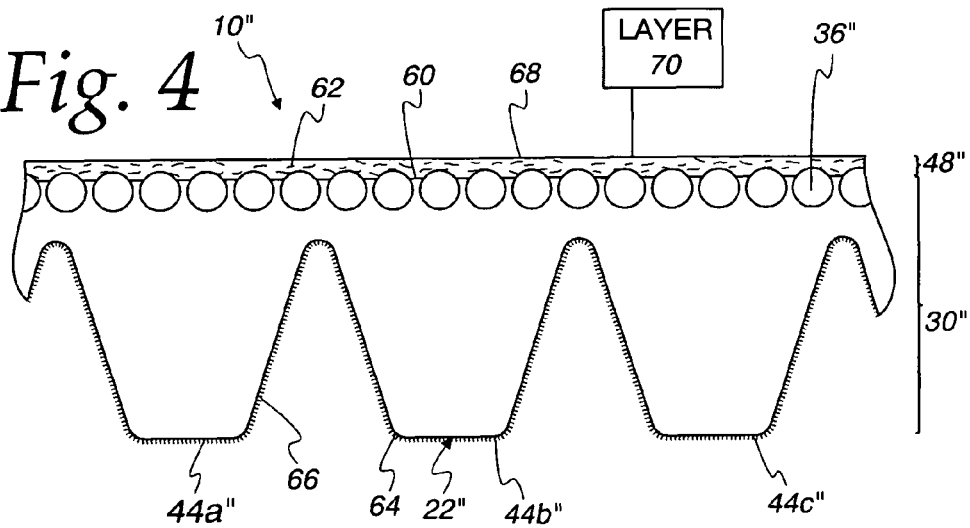
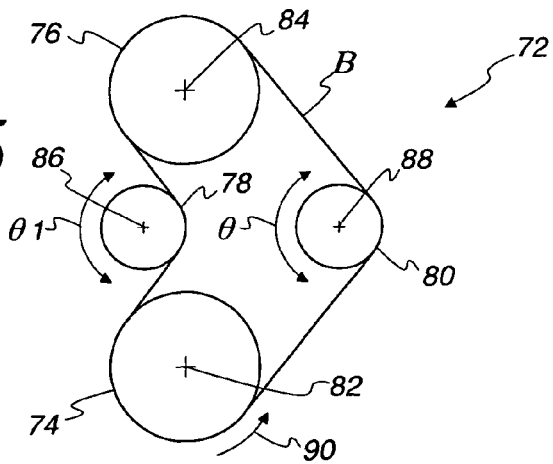

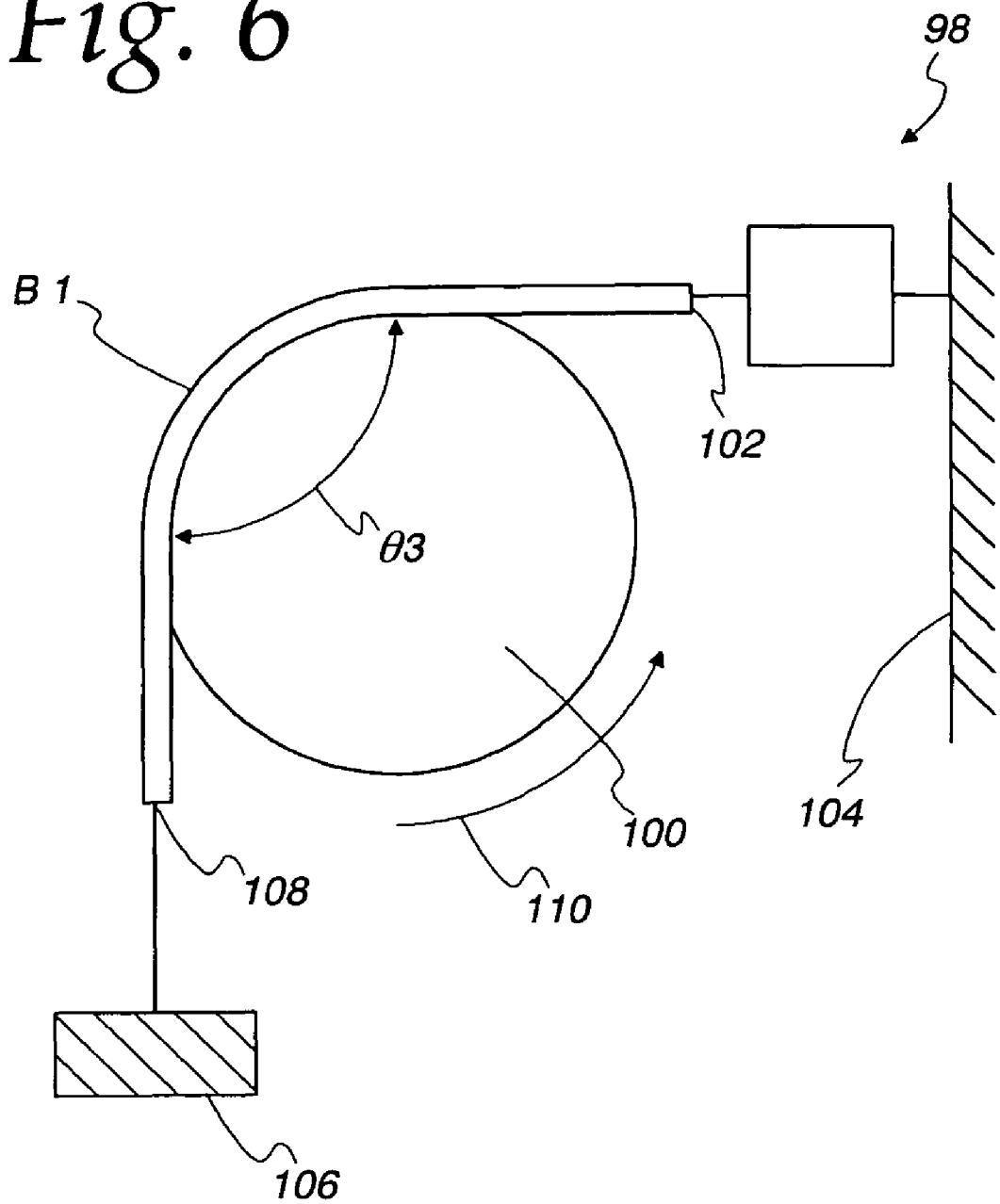

POWER TRANSMISSION BELT

BACKGROUND OF THE INVENTION

1. Field of the Invention

This invention relates to power transmission belts and, more particularly, to a power transmission belt having a body with surfaces defined by rubber that contact cooperating pulleys to frictionally transmit forces between the power transmission belt and the pulleys.

2. Background Art

It is known to make power transmission belts, as used on automobile engines, from rubber, such as natural rubber, styrene/butadiene rubber, and chloroprene rubber. In recent years, the demand for energy conservation has dictated that automobiles be made smaller in size. Engine compartments are being made more compact, as a result of which engine components are being placed in closer proximity to each other. There is generally less unoccupied space within the engine compartments, as a consequence of which the temperature in the engine compartments has risen.

In a high temperature environment, such as in the automobile engine compartments, the rubber of the power transmission belt cures and tends to prematurely generate cracks.

Further, engines designed for energy efficient operation tend to experience significant speed fluctuations in operation. As a consequence of this, the tensile forces on the power transmission belt tend to be increased, which may result in significant frictional wear, unwanted generation of sound, and the like.

Additionally, with a halogen-containing rubber, such as chloroprene, dioxine is generated which is detrimental from an environmental standpoint. It is desirable that belts be produced with rubber not containing a halogen.

To avoid the detrimental environmental effects from halogens, various other products have been developed. Ethylene/α-olefin rubbers, such as ethylene/propylene rubber (EPM) and ethylene/propylene/diene terpolymer rubber (EPDM), have been used and exhibit excellent heat resistance and are relatively inexpensive. These polymers do not contain a halogen.

One example of a power transmission belt using an ethylene/α-olefin elastomer, reinforced with a metal salt of α-β-unsaturated organic acid, is shown in Japanese Patent Document No. JP-T-9-500930. This document is a published Japanese translation of a PCT application.

Because the ethylene/α-olefin elastomer has poor water wettability characteristics and is more water-repellant than is chloroprene rubber, the migration of water between the belt and a cooperating pulley during operation may not be uniform. At locations where there is no water residing between the power transmission belt and cooperating pulley surfaces, there is direct contact between the belt and pulleys. However, where water does reside between the belt and pulleys, the coefficient of friction therebetween decreases, thereby potentially causing slippage between the belt and pulley. This tends to generate stick-slip noise.

In the event that there is a high friction coefficient between the belt and cooperating pulley, unwanted noise may be generated during normal operation. Thus, it has generally been desired to control the coefficient of friction to avoid this condition. This has been accomplished by adding a lubricant. However, if a large amount of lubricant is added, there commonly results detrimental adhesive abrasion.

SUMMARY OF THE INVENTION

In one form, the invention is directed to a power transmission belt having a body with an inside, an outside, and laterally oppositely facing side surfaces. The body has at least one surface that engages a pulley to frictionally transmit forces between the power transmission belt and pulley. The body includes rubber defining at least a part of the at least one surface. The rubber is a composition made up of a blend of at least: a) 100 parts by weight of an ethylene/α-olefin elastomer; b) 10 to 25 parts by weight of a plasticizer having a solubility parameter of from 8.3 to 10.7 $(cal/cm^3)^{1/2}$; and c) 60 to 110 parts by weight of an inorganic filler.

In one form, the inorganic filer includes carbon black.

The inorganic filler may be made from carbon black and at least one of metal carbonate and metal silicate.

In one form, the carbon black has a nitrogen adsorption specific surface area of from 65 to 125 $m^2/g$ and dibutyl phthalate oil absorption of from 90 to 125 $cm^3/100$ g.

The rubber composition may include a plasticizer having a solubility parameter of from 6.0 to 8.1 $(cal/cm^3)^{1/2}$.

The plasticizer a solubility parameter of from 6.0 to 8.1 $(cal/cm^3)^{1/2}$ may be a petroleum plasticizer.

The petroleum plasticizer may be at least one of a paraffin plasticizer and a naphthene plasticizer.

In one form, the rubber composition is a blend of 100 parts by weight of the ethylene/α-olefin elastomer and from 3 to 20 parts by weight of the at least one of the paraffin plasticizer and naphthene plasticizer.

In one form, the plasticizer having a solubility parameter of from 8.3 to 10.7 $(cal/cm^3)^{1/2}$ is an ether ester plasticizer.

In one form, a friction coefficient for the at least one surface is from 0.3 to 0.6.

The power transmission belt may be one of a V-belt and a V-ribbed belt.

The power transmission belt may be more generically a non-toothed belt.

BRIEF DESCRIPTION OF THE DRAWINGS

FIG. 3 is a fragmentary, cross-sectional view of another form of V-ribbed belt, according to the present invention;

FIG. 4 is a view as in FIG. 3 of a still further modified form of V-ribbed belt, according to the present invention;

FIG. 5 is a schematic representation of a system for performing a heat-resistant durability test on a power transmission belt; and FIG. 6 is a schematic representation of a system for performing a friction test on a power transmission belt.

DETAILED DESCRIPTION OF THE DRAWINGS

Figure 1:
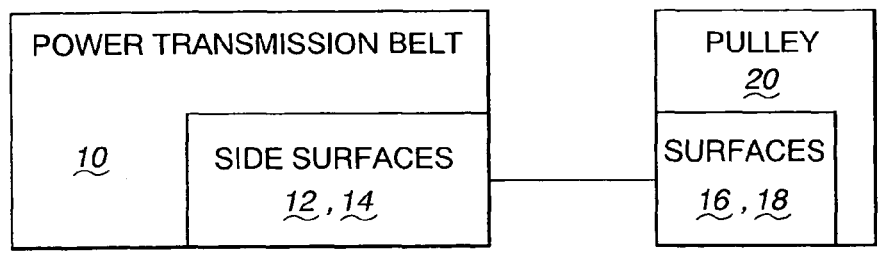
FIG. 1 is a schematic representation of a power transmission belt, according to the present invention.

In FIG. 1, a power transmission belt, according to the present invention, is shown schematically at 10. The power transmission belt 10 is shown in schematic form in that it is intended to encompass virtually a limitless number of different belt types and configurations. The power transmission belt 10 may be a V-belt, a V-ribbed belt, etc., and can be used on virtually an unlimited number of different devices in different industries. As one example, the belt 10 may be used on an automobile. Preferably, the power transmission belt 10 is a non-toothed type with oppositely facing side surfaces 12, 14 that engage complementary surfaces 16, 18 on a cooperating pulley 20. The surfaces 12, 14 and 16, 18 cooperate to frictionally transmit forces between the power transmission belt 10 and pulley 20.

Figure 2:
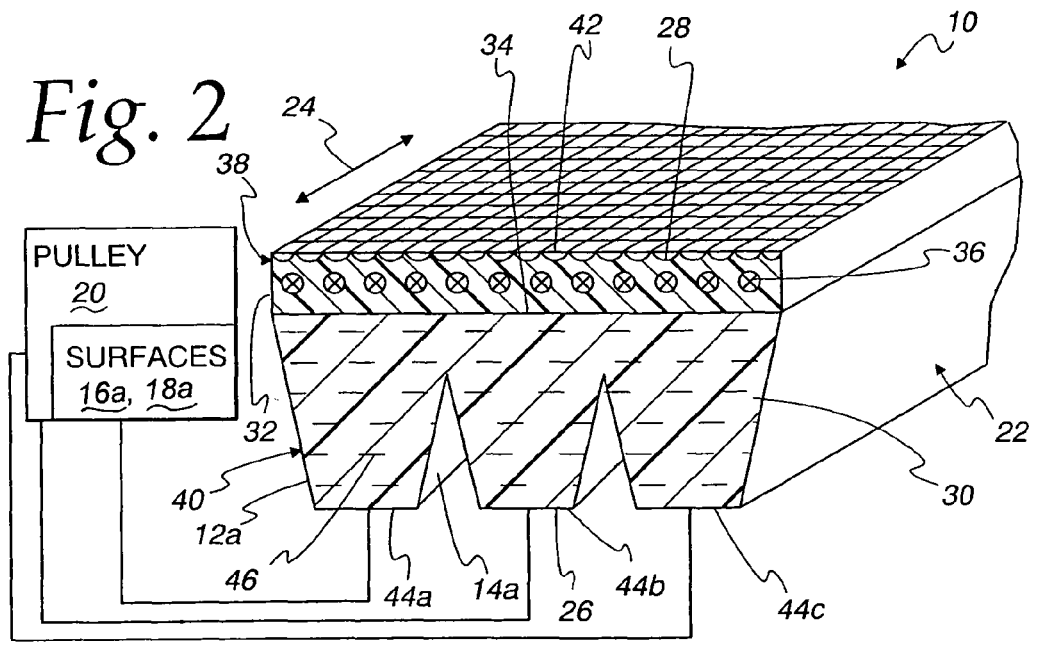
FIG. 2 is a fragmentary, cross-sectional view of a specific form of power transmission belt, according to the present invention, and referred to as a V-ribbed belt.

A specific form of a power transmission belt 10 is shown in FIG. 2. The belt 10 in FIG. 2 is a V-ribbed belt having a body 22 that is endless in a lengthwise direction, as indicted by the double-headed arrow 24. The body 22 has an inside 26 an outside 28.

The body 22 consists of a compression layer 30 and a cushion rubber layer 32 applied to the outside surface 34 of the compression layer 30. A load carrying member 36, in the form of a cord, is embedded in the cushion rubber layer 32 and spirally wrapped therewithin. The load carrying cord 36 defines the belt neutral axis, with a tension section 38 outside of the load carrying cord 36 and a compression section 40 inside of the load carrying cord 36. An extensible, cover canvas layer 42 is applied on the outside 28 of the body 22.

A plurality of, and in this case three (3), ribs 44a, 44b, 44c is formed in the compression section 40. The ribs 44a, 44b, 44c each has a truncated, triangular shape. Exemplary rib 44a has laterally oppositely facing side surfaces 12a, 14a to engage complementary surfaces 16a, 18a of the pulley 20. The ribs 44b, 44c cooperate in like fashion with the pulley 20. The ribs 44a, 44b, 44c are spaced equidistantly in a widthwise direction and each extends continuously around the length of the belt 10.

One preferred form for the load carrying cord 36 is a twisted yarn cord made from a polyethylene terephthalate (PET) fiber, a polyethylene naphthalate (PEN) fiber, a polytrimethylene terephthalate (PTT) fiber, a polybutylene terephthalate (PBT) fiber, a polyparaphenylene benzobisoxazole (PBO) fiber, a polyamide fiber, a glass fiber, an aramid fiber, or the like.

It is preferred that the load carrying cord 36 be subjected to an adhesive treatment. In one form, an untreated cord is dipped in a tank containing a pretreating liquid that is one of an epoxy compound and an isocyanate compound. The dipped cord 36 is then passed through a drying oven, in which a temperature of 160° to 200° C. is maintained, for 30 to 600 seconds to effect drying. The dried cord 36 is then dipped in a tank containing an adhesive liquid including an RFL liquid component. Thereafter, the cord 36 is directed through a stretching, heat fixing treatment vessel, maintained at a temperature of 210° to 260° C., for 30 to 600 seconds, to stretch from −1 to 3%. A stretch-treated cord 36 thereby results.

The isocyanate compound in the pretreating liquid may be, for example, 4,4'-diphenylmethane diisocyanate, tolylene 2,4-diisocyanate, polymethylene polyphenyl diisocyanate, hexamethylene diisocyanate, and polyaryl polyisocyanate (for example, that sold commercially under the trademark PAPI). This isocyanate compound is mixed with an organic solvent such as toluene or methyl ethyl ketone.

Further, it is possible to use a blocked polyisocyanate obtained by reacting the isocyanate compound with blocking agents such as phenols, tertiary alcohols or secondary alcohols, to block isocyanate groups of the polyisocyanate.

Suitable epoxy resins are, for example, reaction products of a polyhydric alcohol such as ethylene glycol, glycerin and pentaerythritol, or polyalkylene glycol such as polyethylene glycol, with a halogen-containing epoxy compound such as epichlorohydrin, and reaction products of polyhydric phenols such as resorcin, bis(4-hydroxyphenyl)dimethylmethane, a phenol-formaldehyde resin or a resorcin-formaldehyde resin, with a halogen-containing epoxy compound. The epoxy resin compound is mixed with an organic solvent such as toluene or methyl ethyl ketone.

The RFL treating liquid is obtained by mixing an initial condensate of resorcin and formaldehyde with a rubber latex. In this case, it is preferred that a molar ratio of resorcin to formaldehyde is from 1:2 to 2:1 to provide the desired adhesive force. Where the molar ratio is less than 1:2, an excessive three-dimensional reaction of a resorcin-formaldehyde resin occurs. On the other hand, where it exceeds 2:1, the reaction between resorcin and formaldehyde may not adequately occur, and the adhesive force detrimentally decreases.

Among suitable rubber latexes are styrene/butadiene/vinyl pyridine terpolymer, a hydrogenated nitrile rubber, a chloroprene rubber, a nitrile rubber, and the like.

It is preferred that a solid content mass ratio of the initial condensate of resorcin/formaldehyde to rubber latex be from 1:2 to 1:8. Within this range, a suitable adhesive force results. If the ratio is less than 1:2, the amount of resorcin/formaldehyde resin increases, as a result of which the RFL coating becomes hard. This may result in deterioration of dynamic adhesion. Where the ratio exceeds 1:8, the resorcin/formaldehyde resin content decreases, as a result of which the RFL coating may become soft. This may detrimentally decrease the resulting adhesive force.

A vulcanization accelerator or a vulcanizing agent may be added to the RFL liquid. Suitable vulcanization accelerators are a sulfur-containing vulcanization accelerator, and specifically, 2-mercaptobenzothiazole (M) and its salts (such as a zinc salt, a sodium salt or a cyclohexylamine salt), thiazoles such as dibenzothiazyldisulfide (DM), sulfenamides such as N-cyclohexyl-2-benzothiazylsulfenamide (CZ), thiurams such as tetramethylthiuram monosulfide (TS), tetramethylthiuram disulfide (TT) or dipentamethylenethiuram tetrasulfide (TRA), dithiocarbamic acid salts such as sodium di-n-butyldithiocarbamate (TP), zinc dimethyidithiocarbamate (PZ) or zinc diethyidimethyldithiocarbamate (EZ), and the like.

Further, as the vulcanizing agent, sulfur, a metal oxide (zinc oxide, magnesium oxide, lead oxide), an organic peroxide, and the like, may be used. The vulcanizing agent is used in combination with the vulcanization accelerator.

The canvas making up the cover canvas layer 42 may be a fiber substrate selected from a woven fabric, a knitted fabric, a non-woven fabric, and the like. Suitable fiber materials are well known. For example: a) natural fibers such as cotton and hemp; b) inorganic fibers such as a metal fiber and a glass fiber; and c) organic fibers such as a polyamide, a polyester, a polyethylene, a polyurethane, a polystyrene, a polyfluoroethylene, an acryl, a polyvinyl alcohol, an all aromatic polyester and an aramid, are suitable. In the case of the woven fabric, it is prepared by subjecting those yarns to a plain weave, diagonal weave, sateen weave process, or other suitable process.

It is preferred that the cover canvas layer 42 be dipped in the RFL liquid using conventional techniques. After dipping in the RFL liquid, friction rubbing using an unvulcanized rubber can be carried out. Alternatively, the cover canvas layer 42 an be treated by dipping the same in a liquid obtained by dissolving a rubber in a solvent. Carbon black may be mixed with the RFL liquid to produce a black color. Alternatively, a conventional surfactant may be added in an amount of from 0.1 to 5.0 mass %.

The compression layer 30 is made from rubber, exposed at the side surfaces 12, 12a, 14, 14a, that is a composition, preferably made up of a blend of: a) 100 parts by weight of an ethylene/α-olefin elastomer; b) 10 to 25 parts by weight of a plasticizer having a solubility parameter of from 8.3 to 10.7 $(cal/cm^3)^{1/2}$; and c) 60 to 110 parts by weight of an inorganic filler.

Due to this construction, wettability with water of the frictional force transmission surfaces is enhanced, as a result of which adhesion of the belt to the pulley engaging surfaces is high, even in the presence of poured water. This composition also contributes to quiet belt operation.

By blending the inorganic filler in an amount of from 60 to 110 parts by weight, a desired bleeding of the plasticizer is promoted, so that the plasticizer acts as a lubricant. As a result, an appropriate friction coefficient can be arrived at with tolerable noise generation during operation.

At the same time, this rubber composition contributes to the controlling of cracks and adhesive abrasion on the pulley engaging surfaces so that belt durability is promoted.

At the same time, the ethylene/α-olefin rubber does not contain a halogen, as potentially represents an environmental hazard.

The ethylene/α-olefin elastomer is preferably a copolymer of ethylene and an α-olefin (propylene, butane, hexane or octene), or a terpolymer of ethylene, the α-olefin and a non-conjugated diene, and may be EPM, EPDM, or the like. As the diene component, non-conjugated dienes having from 5 to 15 carbon atoms, such as ethylidene norbornene, dicyclopentadiene, 1,4-hexadiene, cyclooctadiene and methylene norbornene, are suitable.

The plasticizer has a solubility parameter (SP value) larger than the solubility parameter (about 8.0 $(cal/cm^3)^{1/2}$) of the ethylene/α-olefin elastomer, that is in a range of from 8.3 to 10.7 $(cal/cm^3)^{1/2}$. By blending the plasticizer having an SP value larger than that of the ethylene/α-olefin elastomer, bleeding occurs on the rubber surface, which decreases a friction coefficient over time as drying occurs. This also accounts for uniform wettability in the presence of pouring water, thereby making the friction coefficient stable. Further, by acting as a lubricant, it is possible to suppress a stick-slip phenomenon. The SP value is determined as follows: SP=dΣG/M (d: density, G: molecular attraction constant, M: molecular weight).

Suitable examples of the plasticizer having the solubility parameter in a range of from 8.3 to 10.7 $(cal/cm^3)^{1/2}$ are ether-type, ester-type, ether ester type, phthalic acid derivative-type, adipic acid derivative-type, cebacic acid derivative-type, trimellitic acid derivative-type and phosphoric acid-derivative type plasticizers. Of these, the ether ester-type plasticizer is preferable in that it exhibits an appropriate bleeding effect, and has good wettability with water.

As noted, the plasticizer is blended in an amount of from 10 to 25 parts by weight per 100 parts by weight of the ethylene/α-olefin elastomer. If the blending amount is less than 10 parts by weight, the plasticizer may not be present in an amount sufficient to cover the belt surface. As a result, it is thereby potentially difficult to secure a uniform wettability with water. Additionally, the plasticizer may not be adequately effective as a lubricant.

On the other hand, where the blending amount exceeds 25 parts by weight, there may be a considerable decrease in the surface friction coefficient. Wear resistance may also be detrimentally decreased. In terms of preventing volatilization in a high temperature environment, it is preferred that the average molecular weight of the plasticizer be 300 or more.

Carbon black, metal carbonate, a metal silicate, and the like, are suitable for the inorganic filler. Because of its high strength and reinforcing effect, it is desirable that at least carbon black be used for the filler. That is, the carbon black contributes to good wear resistance.

It is preferable to use carbon black having a nitrogen adsorption specific surface area ($N_2SA$) of from 20 to 150 $cm^2/g$ and a DBP oil absorption of from 50 to 160 $cm^3/100$ g. More preferably, when carbon black having a nitrogen adsorption specific surface area of from 65 to 125 $cm^2/g$ and a dibutyl phthalate oil absorption of from 90 to 125 $cm^3/100$ g is selected, excellent wear resistance may result. The preferred rubber composition contains a large amount of the plasticizer having the solubility parameter of from 8.3 to 10.7 $(cal/cm^3)^{1/2}$. Resultingly, in the absence of carbon black, it may have low wear resistance and adhesive abrasion is liable to occur. By using carbon black having a nitrogen adsorption specific surface area ($N_2SA$) of from 65 to 125 $cm^2/g$ and a dibutyl phthalate oil absorption of from 90 to 125 $cm^3/100$ g as the inorganic filler, excellent wear resistance may result. Also, adhesive abrasion may be reduced. The nitrogen adsorption specific surface area means a specific surface area of carbon black, and is measured according to JIS K 6217-2. Further, the DBP oil absorption (dibutyl phthalate oil absorption) is a measure of structure, and is measured according to JIS K 6217-4.

For the metal carbonate, calcium carbonate can be used. As the metal silicate, calcium silicate, aluminum potassium silicate, aluminum silicate, magnesium silicate, and the like, can be used. For the aluminum silicate, clay can be used. For magnesium silicate, talc can be used. For the aluminum potassium silicate, mica can be used. These can be used alone or in combination. Above all, it is desirable that calcium carbonate have good compatibility with the rubber, and does not adversely affect mechanical properties, such as strength.

It is preferred that the average particle diameter of the inorganic filler be from 0.01 to 3.00 µm. If the average diameter exceeds 3.00 µm, the durability of the belt may be adversely affected. If the average particle diameter for the filler is less than 0.01 µm, dispersibility in the rubber is poor, as a result of which the rubber will not have uniform properties.

The inorganic filler is preferably present in an amount of 60 to 110 parts by weight per 100 parts by weight of the ethylene/α-olefin elastomer. If less than 60 parts by weight are present, the bleeding of the plasticizer may not be adequate. Additionally, adhesive abrasion resistance may not be adequate. On the other hand, if the inorganic filler is present in an amount exceeding 110 parts by weight, flexural resistance deteriorates. Additionally, in the event that carbon black and the metal carbonate and/or the metal silicate are blended to produce the inorganic filler, from the standpoint of strength, wear resistance, and diminishing noise generation, it is preferred that the carbon black be present in an amount from 30 to 100 parts by weight and the metal carbon and/or the metal silicate be present in an amount of 10-80 parts by weight, per 100 parts by weight of the ethylene/α-olefin elastomer.

Good strength also results from the use of the organic filler including a metal carbonate and/or a metal silicate. Wear resistance is promoted while at the same time, noise due to vibration can be suppressed.

By blending plasticizer having a solubility parameter of from 6.0 to 8.1 $(cal/cm^3)^{1/2}$ with the rubber composition, a desired durability of the belt can be achieved. Heat resistance may also be enhanced. Preferably, the solubility parameter of the ethylene/α-olefin elastomer is about 8.0 $(cal/cm^3)^{1/2}$. By blending: a) from 10 to 25 parts by weight of the plasticizer having a solubility parameter from 8.3 to 10.7 $(cal/cm^3)^{1/2}$, and larger than the solubility parameter of the ethylene/α-olefin elastomer; and b) from 60 to 110 parts by weight of the inorganic filler, and by further using a plasticizer having a solubility parameter from 6.0 to 8.1 $(cal/cm^3)^{1/2}$, equal to or smaller than the solubility parameter of the ethylene/α-olefin elastomer, water wettability on the pulley engaging surfaces 12, 14, 12a, 14a is improved, and adhesion of the belt to a pulley is increased even in the presence of pouring water, thereby contributing to silent operation. At the same time: a) appropriate bleeding occurs; b) noise generation during running can be suppressed by reason of the plasticizer's acting as a lubricant; and c) cracking on the pulley engaging surfaces 12, 14, 12a, 14a can be prevented, thereby contributing to the durability of the belt.

For the plasticizer having a solubility parameter of from 6.0 to 8.1 $(cal/cm^3)^{1/2}$, for purposes of improving heat-resistant durability, noise suppression, and processabiilty, a petroleum plasticizer is suitable. A paraffin plasticizer and/or a naphthene plasticizer are preferred used. Preferably, the paraffin plasticizer and/or the naphthene plasticizer are blended in an amount from 3 to 20 parts by weight per 100 parts by weight of the ethylene/α-olefin elastomer. If less than 3 parts by weight are used, the improvement in durability is insignificant. If more than 20 parts by weight are used, adhesive abrasion resistance may deteriorate.

An organic peroxide as a crosslinking agent can be blended with the rubber composition. As the organic peroxide, dicumyl peroxide, di-t-butyl peroxide, t-butylcumyl peroxide, benzoyl peroxide, 1,3-bis(t-butylperoxyisopropyl)benzene, 2,5-dimethyl-2-,5-di(t-butylperoxy)hexyne-3,2,5-dimethyl-2,5-(benzoylperoxy)hexane, and 2,5-dimethyl-2,5-mono(t-butylperoxy)hexane are suitable. The organic peroxide is preferably used alone or as mixture in an amount of from 0.5 to 8 parts by weight per 100 parts by weight of the polymer component.

The rubber composition preferably contains N,N'-m-phenylene dimaleimide and/or quinone dioximes in an amount from 0.5 to 13 parts by weight per 100 parts by weight of the polymer component. The N,N'-m-phenylene dimaleimide and/or quinone dioximes acts as a co-crosslinking agent. If less than 0.5 parts by weight is used, the effect on performance is not significant. By exceeding 13 parts by weight, tear force and adhesive force may rapidly drop.

By selecting N,N'-m-phenylene dimaleimide as the co-crosslinking agent, the crosslinking density increases, wear resistance is high, and the difference in force transmission capability between when water is pouring and the environment is dry is small. Further, by selecting quinine dioximes, adhesion to the fiber substrate is generally excellent.

As the quinine dioximes, p-benzoquinone dioxime, p,p'-dibenzoquinone dioxime, tetrachlorobenzoquinone poly(p-dinitrobenzoquinone), and the like, are preferred. From the standpoint of adhesion and crosslinking density, benzoquinone dioximes, such as p-benzoquinone dioxime and p,p'-dibenzoquinone dioxime, are preferred.

Aside from the above, materials and components normally used in rubber blends, such as short fibers 46, an antioxidant, a stabilizer, a processing aid, a coloring material, etc. may be used. The method of mixing these components with the rubber composition is not limited. As just one example, these components can be kneaded by conventional means using a Banbury mixer, a kneader, or the like.

It is preferred that the cushion rubber layer 32 be made from a rubber component, such as ethylene/α-olefin rubber alone, or mixed with another counter rubber component/composition. The counter rubber component/composition may be, for example, at least one of a butadiene rubber (BR), a styrene-butadiene rubber (SBR), a nitrile rubber (NBR), a hydrogenated nitrile rubber (H-NBR), a chloroprene rubber (CR), a butyl rubber (IIR) and a natural rubber (NR). Of course, it is contemplated that the same rubber composition, as described above, can be used.

The V-ribbed belt construction may vary from that shown in FIG. 2. As an example of such a variation, the V-ribbed belt does not require a cushion rubber layer, as that 32 shown in FIG. 2. The cover canvas layer 42 may be eliminated to expose the outside surface 28 of the body 22. Other specific forms of modified V-ribbed belts are shown in FIGS. 3 and 4, and described hereinbelow.

One modified form of V-ribbed belt is shown at 10' in FIG. 3. The belt 10' has a body 22' consisting of a tension layer 48, a cushion rubber layer 32', and a compression layer 30'. The body 22' has an inside 50 and an outside 52. The outside 52 of the body 22' has a fiber-immersed layer 54 applied thereto that is made up of a rubber composition with fibers therein.

A load carrying member cord 36' is embedded in the body 22'. The load carrying member 36' resides partially in the cushion rubber layer 32' and partially in the tension layer 48.

The compression layer 30' has ribs 44a', 44b', 44c' formed therein with the same general configuration as the ribs 44a, 44b, 44c on the belt 10 in FIG. 2. The ribs 44a', 44b', 44c' extend continuously in a lengthwise direction and are spaced equidistantly in a lateral direction.

Short fibers 56 in the compression layer 30' conform nominally to the shape of the ribs 44a', 44b', 44c' and are more closely conformed to the rib shape adjacent the exposed surface 58 on the compression layer 30'. Whereas the fibers 56 shown in the compression layer 30' are arranged to nominally conform to the rib shape, it is also contemplated that the fibers 56 might be oriented so that their lengths are aligned in a widthwise direction.

The tension layer 48, to which the fiber-immersed layer 54 is applied, preferably does not contain any short fibers. However, it is also contemplated that fibers might be used in the tension layer 48.

A further modified form of V-ribbed belt is shown at 10" in FIG. 4. The V-ribbed belt 10" has the same overall shape as the belts 10, 10', previously described. The body 22" is made up of a tension layer 48" and a compression layer 30". The tension layer 48" is applied to the outside 60 of the compression layer 30".

A load carrying member/cord 36" is embedded in the compression layer 30" and in contact with the tension layer 48". Short fibers 62 are embedded in the tension layer 48". The fibers 62 are randomly arranged in the tension layer 48".

Ribs 44a", 44b", 44c" are formed in the compression layer 30". The ribs 44a", 44b", 44c" have the same shape as the aforementioned ribs 44a, 44a', 44b, 44b', 44c, 44c', and extend continuously in laterally spaced relationship along the length of the body 22".

A fiber-immersed layer 64 is applied to the exposed rib surface 66.

The belt 10" differs from those in the prior embodiments in that there is no layer applied to the outside surface 68 of the body 22". Whereas short fibers 62 are shown in the tension layer 48", no fibers are embedded in any corresponding tension layer in the other embodiments.

Concave/convex patterns can be provided on the outside surface 68 to avoid abnormal noise generation when the outside surface/back surface 68 drives or is driven by, a cooperating pulley. The concave/convex pattern may be defined by a layer 70 that may be a knitted fabric, woven fabric, bamboo blind woven fabric, and the like. Of these, the woven fabric pattern is most preferable.

The fibers 62 can be made from polyester, aramid, nylon, cotton, and the like, used alone or blended.

The rubber making up the tension layer 48" and compression layer 30" may be the same as that for the bodies on the belts 10, 10', described above.

Whereas the fibers 62 are shown to be randomly oriented, it is also contemplated that they may be oriented so that their lengths align in a lateral/widthwise direction. The random orientation tends to resist tearing and cracking from forces applied in multiple directions. When short fibers having bent portions, such as those produced by milling are used, forces in multiple directions tending to tear the rubber or generate cracks are resisted.

In this embodiment, there is no discrete cushion rubber layer. The load carrying cord 36" is embedded primarily in the compression layer 30" but resides at the interface between the compression layer 30" and tension layer 48". To produce adequate adhesion between the load carrying member cord 36" and the rubber in the body 22", it is preferred that at least one of the tension layer 48" and compression layer 30" be devoid of short reinforcing fibers.

In the event that the outside surfaces of the belts are used for power transmission, the rubber therein may be made using the inventive rubber composition, that is contemplated for use on the pulley engaging side surfaces.

For all of the belts 10, 10', 10" described herein, it is preferred that the friction coefficient of the surfaces that frictionally transmit forces, including the rib side surfaces and outside surfaces on the belts, be in the range of 0.3 to 0.6. If the coefficient is less than 0.3, it may be difficult to effectively transmit drive forces. If the coefficient exceeds 0.6, undesirable noise generation may occur. The friction coefficient is measured by tests, as described hereinbelow.

Various methods for producing the inventive belts are also described below. It should be understood that these methods are exemplary in nature only as others are contemplated consistent with the inventive concepts.

Method 1

Sheets making up a tension layer and a cushion rubber layer are wound around the circumference of cylindrical molding drum. A load carrying member/cord is spirally wrapped therearound. A sheet defining the compression layer is then wrapped around the drum to produce an unvulcanized sleeve, which is thereafter vulcanized. The vulcanized sleeve is trained around spaced driving and driven rollers, and driven under a predetermined tension. A rotating grinding wheel is moved relative to the sleeve to contact the same and thereby form 3-100 grooves in the compression layer around the length of the sleeve. This produces individual ribs with the pulley engaging surfaces thereon. The sleeve is then separated from the driving and driven rollers and trained around another set of driving and driven rollers and driven in an endless path therearound. The sleeve is then cut to predetermined widths with a cutter to form the individual V-ribbed belts.

Method 2

Separate rubber sheets, defining compression and cushion rubber layers, are wound around a cylindrical molding drum. The molding drum has a contoured circumferential surface that is configured to be complementary to the desired end shape of the ribs on the completed belts. With the sheets in place, a load carrying member/cord is spirally wrapped, followed by another sheet that defines the tension layer, to thereby provide an unvulcanized sleeve. The sleeve is thereafter vulcanized while being pressed against the contoured molding drum surface so that the compression layer sheet conforms thereto. The vulcanized sleeve is then removed from the molding drum. Polishing of the rib surfaces may be carried out, as needed. The sleeve is then cut into predetermined widths to form the individual V-ribbed belts.

Method 3

Separate sheets, making up the tension layer and cushion rubber layer, are wrapped on a flexible jacket that is placed over a cylindrical molding drum. The load carrying member/cord is spirally wrapped thereover. A sheet defining the compression layer is thereafter wrapped around the drum to produce an unvulcanized sleeve. The flexible jacket is then expanded to press the unvulcanized sleeve against an outer mold having a contoured surface complementary to the desired end configuration for the ribs on the completed belts. Vulcanization is carried out with this outward pressure applied. The vulcanized sleeve is then separated, and the rib surfaces polished, as necessary. The sleeve is then cut into predetermined widths to produce the individual V-ribbed belts.

Method 4

A rubber sheet defining the compression layer is wrapped around a flexible jacket mounted on a cylindrical molding drum to produce a first unvulcanized sleeve. The flexible jacket is expanded to press the sleeve against an outer mold having a surface contoured to correspond to the desired rib shapes.

Sheets defining the tension layer and cushion rubber layer are wrapped around an inner mold. A load carrying member/cord is spirally wrapped to form a separate, second, unvulcanized sleeve. The flexible jacket is expanded to press the second unvulcanized sleeve radially outwardly to against the outer mold having the formed compression layer. The two sleeves are then united and vulcanized. The vulcanized sleeve can then be separated and the rib surfaces thereon polished, as needed. The belt is then cut to predetermined widths to produce individual V-ribbed belts.

In certain constructions, the compression layer of the V-ribbed belt may be made from separate layers; an exposed inner layer and an outer layer. The separate layers may be pre-formed and then wrapped around a molding component, or may be separately wrapped, in turn, around the molding component. Since in METHOD 1, the ribs are formed by polishing, the inner layer is exposed at the rib crests, with the outer layer exposed on the sides or bottoms of the ribs. For this reason, it is preferred that only METHODS 2, 3 or 4, described above, be used when separate layers for the compression layer are utilized.

With V-ribbed belts, as in FIG. 4, where there is no discrete cushion rubber layer, the methods described above can be performed, as described above, with the exception of applying the cushion rubber sheet/layer.

In the V-ribbed belts as in FIG. 3, wherein the fibers 56 conform nominally to the rib shape, manufacture using METHODS 2, 3 and 4 is preferred. For those constructions in which the fibers in the compression layer are aligned in a lateral orientation, it is preferred that METHOD 1 be utilized.

Specific examples of the inventive belt (Inventive Examples) are described below and the performance/characteristics thereof compared to other belts (Comparative Examples).

INVENTIVE EXAMPLES 1-5 AND COMPARATIVE EXAMPLES 1-7

The V-ribbed belts were all made with a load carrying member/cord, made of a polyester fiber and embedded in a cushion rubber layer. Two plies of cotton canvas with rubber coating were laminated on the outsides of the cushion rubber layers. Three ribs were formed in each compression rubber layer, that was applied on the inside of the cushion rubber layer. The ribs were spaced equidistantly in a widthwise direction and extended the full length of the belts.

The compression layers were made with a rubber composition as shown in Table 1, below.

TABLE 1

|  | Inventive Examples ||||| Comparative Examples |||||||
|---|---|---|---|---|---|---|---|---|---|---|---|---|
|  | 1 | 2 | 3 | 4 | 5 | 1 | 2 | 3 | 4 | 5 | 6 | 7 |
| EPDM*[1] | 100 | 100 | 100 | 100 | 100 | 100 | 100 | 100 | 100 | 100 | 100 | 100 |
| Short fiber*[2] | 25 | 25 | 25 | 25 | 25 | 25 | 25 | 25 | 25 | 25 | 25 | 25 |
| Zinc oxide*[3] | 5 | 5 | 5 | 5 | 5 | 5 | 5 | 5 | 5 | 5 | 5 | 5 |
| Stearic acid | 1 | 1 | 1 | 1 | 1 | 1 | 1 | 1 | 1 | 1 | 1 | 1 |
| HAF carbon black | 65 | 65 | 65 | 70 | 65 | 65 | 65 | 50 | 65 | 65 | 65 | 65 |
| Calcium carbonate | 35 | — | — | 30 | — | — | — | — | — | — | — | — |
| Antioxidant | 2 | 2 | 2 | 2 | 2 | 2 | 2 | 2 | 2 | 2 | 2 | 2 |
| Ether ester type plasticizer*[4] | 25 | 15 | — | 15 | 15 | — | 3 | 15 | 5 | 27 | 7 | 3 |
| DOS*[5] | — | — | 15 | — | — | — | — | — | — | — | — | — |
| Paraffin oil*[6] | — | — | — | 7 | 5 | 15 | 2 | — | — | — | 15 | 3 |
| Co-crosslinking agent*[7] | 2 | 2 | 2 | 2 | 2 | 2 | 2 | 2 | 2 | 2 | 2 | 2 |
| Organic peroxide*[8] | 8 | 8 | 8 | 8 | 8 | 8 | 8 | 8 | 8 | 8 | 8 | 8 |
| Sulfur | 0.3 | 0.3 | 0.3 | 0.3 | 0.3 | 0.3 | 0.3 | 0.3 | 0.3 | 0.3 | 0.3 | 0.3 |

*[1]Ethylene content 58 wt %, diene component: ethylidene norbornene
*[2]Nylon cut yarn 3 mm
*[3]"Zinc flower", a product of Seido Kagaku Kogyo K. K.
*[4]"ADEKACIZER", a product of Adeka Corporation, SP value: 8.5, molecular weight: 500
*[5]"DOS", a product of Kyowa Hakko Kogyo Co., Ltd., SP value: 8.5, molecular weight: 430
*[6]"Diana Process Oil", a product of Idemitsu Kosan Co., Ltd., SP value: 7.5
*[7]N,N-m-phenylene dimaleimide
*[8]1,3-bis(t-butylperoxyisopropyl)benzene 40 wt %, calcium carbonate 60 wt %

Kneading was carried out using a Banbury mixer, with rolling performed with a calendar roll. HAF carbon black was used with a nitrogen adsorption specific surface area of 83 m$^2$/g and a dibutyl phthalate oil absorption of 102 cm$^2$/100 g. Each compression layer had short fibers with lengths aligned in a widthwise direction. Each cushion rubber layer was made from a rubber formulation in which short fibers were removed from the rubber composition shown in Table 1. The rubber composition having the formulation shown in Table 1 was press crosslinked at 165° C. for 30 minutes. The properties of the resulting crosslinked rubber were evaluated. Hardness (JIS-A) of the cross linked rubber was measured according to JIS K6253. Elongation at break (EB), in a direction perpendicular to the orientation direction of the fibers, was measured according to JIS K6251. The results are shown in Table 2, below.

TABLE 2

|  | Inventive Examples ||||| Comparative Examples |||||||
|---|---|---|---|---|---|---|---|---|---|---|---|---|
|  | 1 | 2 | 3 | 4 | 5 | 1 | 2 | 3 | 4 | 5 | 6 | 7 |
| HAF carbon black | 65 | 65 | 65 | 70 | 65 | 65 | 65 | 50 | 65 | 65 | 65 | 65 |
| Calcium carbonate | 35 | — | — | 30 | — | — | — | — | — | — | — | — |
| Ether ester type plasticizer*[4] | 25 | 15 | — | 15 | 15 | — | 3 | 15 | 5 | 27 | 7 | 3 |
| DOS*[5] | — | — | 15 | — | — | — | — | — | — | — | — | — |
| Paraffin oil*[6] | — | — | — | 7 | 5 | 15 | 2 | — | — | — | 15 | 3 |
| Hardness (JIS-A) | 82 | 82 | 83 | 83 | 82 | 84 | 87 | 80 | 84 | 78 | 83 | 85 |
| CMD EB (%) | 257 | 241 | 222 | 229 | 216 | 220 | 196 | 269 | 200 | 315 | 232 | 209 |
| Friction coefficient |  |  |  |  |  |  |  |  |  |  |  |  |
| DRY | 0.34 | 0.44 | 0.46 | 0.42 | 0.46 | 0.97 | 0.90 | 0.59 | 0.74 | 0.32 | 0.78 | 0.95 |
| WET | 0.31 | 0.37 | 0.40 | 0.36 | 0.37 | 0.66 | 0.70 | 0.48 | 0.50 | 0.28 | 0.59 | 0.70 |
| Heat-resistant durable running Crack generation time (h) | 380 | 460 | 400 | — | — | — | 290 | — | 370 | — | — | 320 |
| Crack (number) | 7 | 3 | 8 | none | none | none | 14 | none | 12 | none | none | 15 |
| Adhesive abrasion test Adhesive state | none | none | none | none | none | none | none | Moderate | none | large | small | none |

*[4]"ADEKACIZER", a product of Adeka Corporation, SP value: 8.5, molecular weight: 500
*[5]"DOS", a product of Kyowa Hakko Kogyo Co., Ltd., SP value: 8.5, molecular weight: 430
*[6]"Diana Process Oil", a product of Idemitsu Kosan Co., Ltd., SP value: 7.5

The belts were produced as follows. Two plies of rubberized cotton canvas and a cushion rubber layer were wound around a flat cylindrical molding drum. Thereafter, a load carrying member/cord was spirally wrapped, over which a compression rubber layer was wound. A vulcanization jacket was then applied over the compression rubber layer. The molding drum with the jacket thereon was placed in a container and vulcanized. The compression rubber layer on the vulcanized sleeve was ground with a grinder to form individual ribs, and then cut to width to produce the finished V-ribbed belts.

Heat-resistant durability, adhesive abrasion resistance, and friction tests, as described below, were conducted. The heat-resistant durability test was conducted using a system as shown at 72 in FIG. 5. The system 72 consists of a drive pulley 74, a driven pulley 76, an idler pulley 78, and a tensioning pulley 80. The pulleys 74, 76, 78, 80 are rotatable around parallel axes 82, 84, 86, 88, consecutively, which axes are substantially parallel, each with the other. The drive pulley 74 has a diameter of 120 mm, with the driven pulley 76 having a diameter of 120 mm, the idler pulley 78 having a diameter of 85 mm, and the tensioning pulley 80 having a diameter of 45 mm.

The belt B being tested was trained around the pulleys 74, 76, 78, 80 as shown. The winding angle θ for the belt B around the tensioning pulley 80 was 90°. The winding angle θ1 of the belt B around the idler pulley 78 was 120°. The belt B was driven by the drive pulley 74, rotated in the direction of the arrow 90, with a load applied thereto. The ambient temperature was 120° C. The driving pulley 74 was operated at 4900 rpm with a belt tension of 57 kgf/3 ribs. A load was applied to the driven pulley 76 of 12 PS. The belt B was run for 500 hours under these conditions. The running time elapsed when six (6) cracks were generated, reaching the load carrying member/cord, was noted.

In conducting the adhesive abrasion resistance test, each V-ribbed belt was trained around a driving pulley having a 120 mm diameter, a driven pulley having a 120 mm diameter, and an idler pulley having a 45 mm diameter. The belts were run at room temperature. The load on the driven pulley was 2 horsepower, with a fitting load on the idler pulley of 102 kgf. The driving pulley was operated at 800 rpm for 24 hours. The presence or absence of adhesive abrasion on the belt surfaces was noted.

To perform the friction test, a system, as shown at 98 in FIG. 6, was utilized. A length B1 of a V-ribbed belt, with three (3) ribs, was placed against a stainless steel guide roller 100 having a diameter of 60 mm, with a pulley groove angle of 36° and a pulley groove end pitch of 3.56 mm. The winding angle θ3 of the belt section B1 was 90°. One end 102 of the belt section B1 was fixed relative to a support 104. A weight 106, generating a force of 1.75 kgf/3 ribs, was hung on the opposite end 108 of the belt section B1. A load cell value, generated while rotating the guide roller 100 at 42 rpm in the direction of the arrow 110, was measured to detect a tension T1 at the tightened end of the belt section B1 and a tension T2 (1.75 kgf) at the relaxed end of the belt section B1. The friction coefficient $\mu=(1/2\Pi) \ln(T1/T2)$ was determined from the tension ratio T1/T2. The measurement time records 5 to 30 seconds after running the pulley, and T1 uses its maximum value. In measuring the friction coefficient, evaluation was made both with the system dry (DRY) and while pouring water (WET) in an amount of 60 cc/min.

The results of the heat-resistant durability test, adhesive abrasion test, and friction test are shown in Table 2, above.

With Comparative Example 1, the plasticizer with a large SP value did not exhibit good blending. The friction coefficient in both DRY and WET conditions was high, with the difference between DRY and WET conditions likewise large.

In Comparative Examples 2 and 7, a plasticizer having a large SP value and a plasticizer having a small SP value were blended together. However, the difference between DRY and WET conditions was still large, with the friction coefficient likewise high. Thus, little suppression of noise was contemplated.

In Comparative Example 3, a plasticizer with a large SP value was blended in an appropriate amount, but the blending amount of the inorganic filler was small. As a result, the plasticizer did not bleed adequately, with the result being that the friction coefficient under DRY conditions was not satisfactorily reduced. Further, in the adhesive abrasion test, the adhesion was high.

In Comparative Example 4, because only a small amount of the plasticizer having a large SP value was blended, the reduction in friction coefficient under DRY conditions was not sufficient. Further, the difference in friction coefficient between DRY and WET conditions was large.

In Comparative Example 5, because a large amount of the plasticizer having a large SP value was blended, the friction coefficient decreased too much under both DRY and WET conditions. At the same time, the adhesive abrasion resistance decreased remarkably.

With Comparative Example 6, a plasticizer having a large SP value and a plasticizer having a small SP value were added in amounts greater than for Comparative Examples 2 and 7. The difference between DRY and WET conditions was small, but the friction coefficient was relatively low, but not sufficient. Further, generation of adhesive abrasion was observed.

On the other hand, with the Inventive Examples, heat-resistant durability and adhesive abrasion resistance were not impaired. Further, the friction coefficient under DRY conditions was maintained low, with the friction coefficient under WET conditions not appreciably decreased when compared to that under DRY conditions. That is, the difference in friction coefficient between DRY and WET conditions was small.

With Inventive Examples 4 and 5 in the heat-resistant running test, cracks did not generate over the test period. Heat-resistant durability was further improved.

On the other hand, with Inventive Examples 1 and 3, cracks appeared during the heat-resistant running testing. However, heat-resistant durability was good within an allowable range, with other performance characteristics likewise being good.

As confirmed by the testing, the inventive belts, made as described herein, potentially are highly durable and have excellent power transmission properties, even in the presence of poured water. The belts may be operable without excessive noise generation and further may exhibit excellent flexural fatigue resistance, heat resistance, and wear resistance.

The foregoing disclosure of specific embodiments is intended to be illustrative of the broad concepts comprehended by the invention.

The invention claimed is:

1. A power transmission belt comprising:
a body with an inside and outside and laterally oppositely facing side surfaces,
the body having at least one surface that engages a pulley comprising at least one surface to frictionally transmit forces between the power transmission belt and pulley,
the body comprising rubber defining at least a part of the at least one surface that is a composition comprising a blend of: a) 100 parts by weight of an ethylene/α-olefin elastomer; b) 10 to 25 parts by weight of a first plasticizer having a solubility parameter of from 8.3 to 10.7

(cal/cm$^3$)$^{1/2}$; and c) 60 to 110 parts by weight of an inorganic filler comprising carbon black, wherein the carbon black has a nitrogen adsorption specific surface area of from 65 to 125 m$^2$/g and dibutyl phthalate oil absorption of from 90 to 125 cm$^3$/100 g, wherein a friction coefficient between the at least one surface of the power transmission belt and the at least one surface of the pulley for the at least one surface is from 0.3 to 0.6 and said inorganic filler and said first plasticizer promote bleeding of said first plasticizer.

2. The power transmission belt according to claim 1 wherein the inorganic filler comprises at least one of metal carbonate and metal silicate.

3. The power transmission belt according to claim 1 wherein the rubber composition comprises a second plasticizer having a solubility parameter of from 6.0 to 8.1(cal/cm$^3$)$^{1/2}$.

4. The power transmission belt according to claim 2 wherein the rubber composition comprises a second plasticizer having a solubility parameter of from 6.0 to 8.1(cal/cm$^3$)$^{1/2}$.

5. The power transmission belt according to claim 3, wherein the second plasticizer having a solubility parameter of from 6.0 to 8.1(cal/cm$^3$)$^{1/2}$ comprises a petroleum plasticizer.

6. The power transmission belt according to claim 4, wherein the second plasticizer having a solubility parameter of from 6.0 to 8.1(cal/cm$^3$)$^{1/2}$ comprises a petroleum plasticizer.

7. The power transmission belt according to claim 5, wherein the petroleum plasticizer comprises at least one of a paraffin plasticizer and a naphthene plasticizer.

8. The power transmission belt according to claim 6, wherein the petroleum plasticizer comprises at least one of a paraffin plasticizer and a naphthene plasticizer.

9. The power transmission belt according to claim 7 wherein the rubber composition comprises a blend of 100 parts by weight of the ethylene/α-olefin elastomer and from 3 to 20 parts by weight of the at least one of the paraffin plasticizer and naphthene plasticizer.

10. The power transmission belt according to claim 8 wherein the rubber composition comprises a blend of 100 parts by weight of the ethylene/α-olefin elastomer and from 3 to 20 parts by weight of the at least one of the paraffin plasticizer and naphthene plasticizer.

11. The power transmission belt according to claim 1 wherein the first plasticizer having a solubility parameter of from 8.3 to 10.7 (cal/cm$^3$)$^{1/2}$ is an ether ester plasticizer.

12. The power transmission belt according to claim 2 wherein the first plasticizer having a solubility parameter of from 8.3 to 10.7 (cal/cm$^3$)$^{1/2}$ is an ether ester plasticizer.

13. The power transmission belt according to claim 3 wherein the first plasticizer having a solubility parameter of from 8.3 to 10.7 (cal/cm$^3$)$^{1/2}$ is an ether ester plasticizer.

14. The power transmission belt according to claim 5 wherein the first plasticizer having a solubility parameter of from 8.3 to 10.7 (cal/cm$^3$)$^{1/2}$ is an ether ester plasticizer.

15. The power transmission belt according to claim 7 wherein the first plasticizer having a solubility parameter of from 8.3 to 10.7 (cal/cm$^3$)$^{1/2}$ is an ether ester plasticizer.

16. The power transmission belt according to claim 9 wherein the first plasticizer having a solubility parameter of from 8.3 to 10.7 (cal/cm$^3$)$^{1/2}$ is an ether ester plasticizer.

17. The power transmission belt according to claim 1 wherein the power transmission belt is one of a V-belt and a V-ribbed belt.

18. The power transmission belt according to claim 1 wherein the power transmission belt is a non-toothed belt.

* * * * *